UNITED STATES PATENT OFFICE.

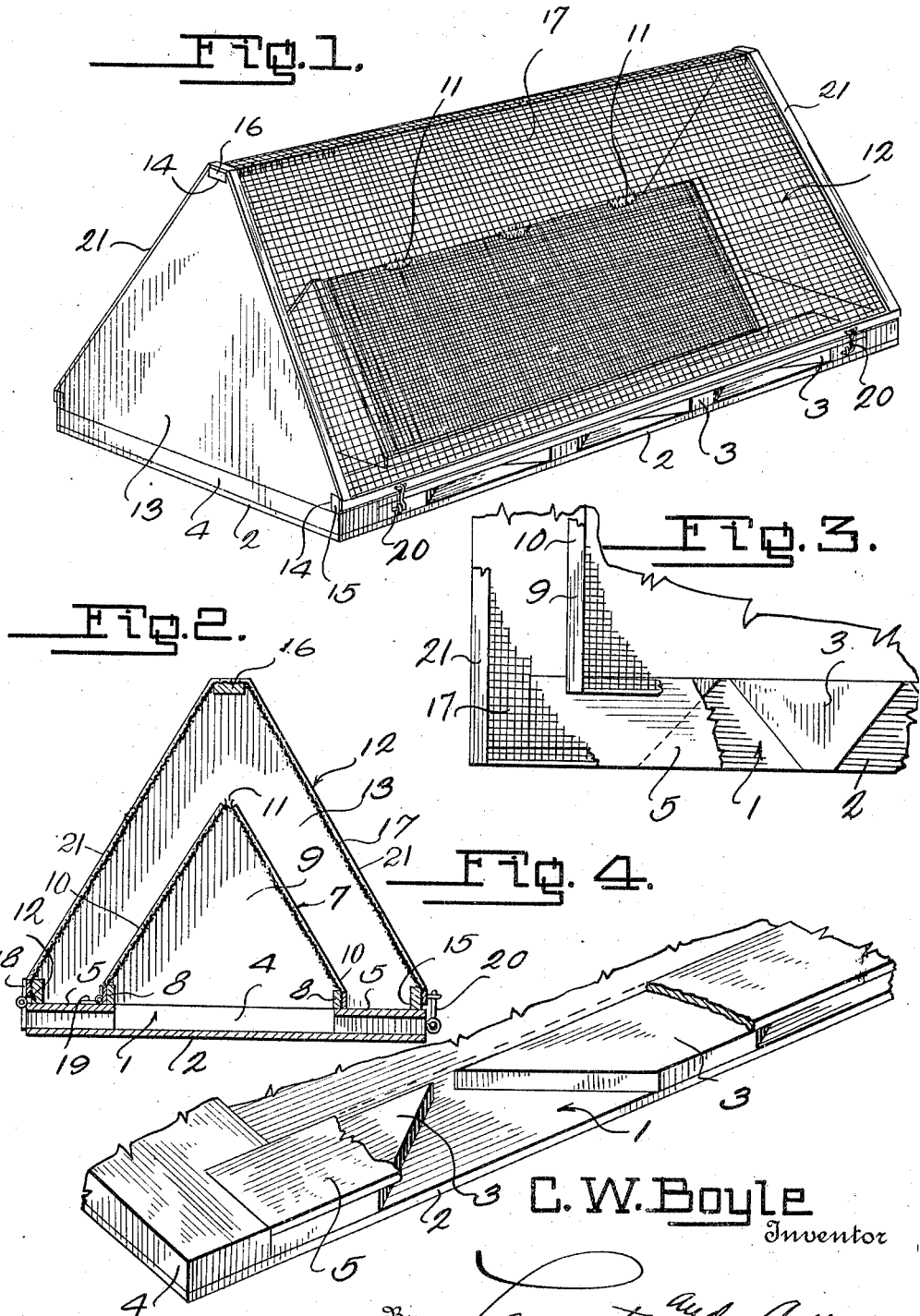

CHARLES W. BOYLE, OF PITTSBURGH, PENNSYLVANIA.

INSECT-TRAP.

1,312,096. Specification of Letters Patent. Patented Aug. 5, 1919.

Application filed November 25, 1918. Serial No. 264,066.

*To all whom it may concern:*

Be it known that I, CHARLES W. BOYLE, a citizen of the United States, residing at Pittsburgh, in the county of Allegheny and State of Pennsylvania, have invented certain new and useful Improvements in Insect-Traps, of which the following is a specification.

This invention relates to insect or fly traps, and an object of the invention is to provide a trap which is comparatively simple in construction and by means of which flies are enticed into a suitable entrance compartment, having communication through a plurality of relatively small lead openings into a confining compartment, where they are confined until killed or destroyed.

It is well known that flies will alight upon wood surfaces, preferably to metal, or any other type of surface when wood surfaces are convenient, and it is an object of this invention to provide a fly trap as specified, the bottom of which is made up of a plurality of layers or sections of wood, providing a main supporting bottom board upon which are mounted a plurality of substantially triangularly shaped blocks forming sleeves having constricted outlets which open into the square space within the said blocks, upon the upper surface of the bottom plate and to mount strips of wood upon the upper surfaces of the said blocks to provide covers for the open leading spaces and further to hingedly connect an entrance lead and a confining member to the wooden bottom structure of the trap so as to permit the removal of the flies therefrom after the flies have been killed or destroyed.

Other objects of the invention will appear in the following detailed description taken in connection with the accompanying drawing forming a part of this specification and in which drawing:

Figure 1 is a perspective view of the improved fly trap,

Fig. 2 is a cross section through the fly trap,

Fig. 3 is a fragmentary horizontal section through the fly trap, and

Fig. 4 is a fragmentary perspective view of a part of the base construction of the trap.

Referring more particularly to the drawings, 1 indicates the base of the trap as an entirety, which includes a bottom board 2, being relatively thin, and rectangular in shape, having a plurality of blocks 3 attached to its upper surfaces. The facing ends of the blocks 3 are cut at obtuse angles with respect to the longitudinal lines of the block, so as to provide lead or entrance openings which lead into the space within the inner edges of the blocks 3. These blocks are relatively narrow, and are attached to the upper surface of the bottom board 2 at the edges of the same, and by angling the ends of the said blocks, the leads or entrance openings are constricted at their inner ends, for leading the insects or flies into the same inwardly of the inner edges of the block. The bottom board 2 has end strips 4 which are of slightly greater height than the blocks 3 attached to its upper surfaces at its end, and strips 5 are positioned upon the upper surfaces of the blocks 3, forming closures for the top or upper portions of the entrance opening between the facing ends of the blocks.

A suitable bait may be positioned upon the inner surface of the bottom board 2 in the space within the inner edges of the blocks 3, end strips 4 and cover strips 5 for attracting the flies into the said space. A substantially pyramidal lead construction 7 is provided, which includes longitudinal extending side bars 8 at its lower or base edges and upstanding angularly disposed sides formed of screen or analogous foraminous material, which screen is attached to the triangularly shaped end plate 9 of the sleeve structure 7, the outer end portions of the screen or foraminous material being covered by the binding strips 10. The apex of the pyramidal lead construction 7 is provided with a plurality of longitudinally spaced openings 11, to permit the exit of the flies from within the lead structure 7 into the confining cage 12. The wire end about the opening 11 extends outwardly into the confining cage 12 forming tongues to retard the passage of flies from the confining cage into the lead structure 7.

The confining cage 12 comprises substantially triangularly shaped end pieces 13, which are formed of wood or analagous material and have cut out portions 14 at their corners, to receive the longitudinally extending base strips 15 and the longitudinally extending apex strips 16 to which strip is attached the screen wire or analogous foraminous material 17 of which the side of the confining cage 12 is formed. The base strip 15 rests upon the upper surface of the upper strip 5 of the base construction 1 and one of the strips is hingedly connected, by means of hinges 18 to the ends of the end strip 4 of the base construction to permit the confining cage to be swung outwardly from over the base structure to permit the removal of insects or flies therefrom. The lead 7 is also hingedly connected, by means of hinges 19 to the base structure to permit this lead member to be swung outwardly from over the central space or opening within the base structure 1, for re-baiting the trap or for any other suitable purpose. Suitable hook or catch structure 20 may be provided for holding the free edges of the lead structure 7 and the confining cage 12 connected to the base to prevent the accidental outward hinged movement of these members. Suitable binding strips 21 are mounted about the outer surface of the screen wire 17 at its ends, binding the ends securely in engagement with the upper edges of the end plate or boards 13 of the confining cage 12.

Any suitable bait may be placed upon the upper surface of the bottom board 2 within the space centrally thereof, and it will attract the flies or other insects which will enter through the leads or entrance openings between the facing angled ends of the blocks 3 and after the insects have fed, they will, owing to their natural traits, either fly or walk upwardly through the leads 7 and pass out of the opening 11 into the confining cage 12. When it is desired, any suitable insecticide may be used for killing the insects or flies within the confining cage 12, after which this cage is swung upon its hinges 18 to permit the removal of the said insects or flies therefrom.

Changes in details may be made without departing from the spirit of this invention, but;

I claim:

1. In an insect trap, the combination, of a base structure comprising a bottom board, a plurality of blocks attached to the upper surface of said board about its side edges, the facing ends of said blocks being angled to provide converging lead openings opening out through constricted openings into the space between the inner edges of the blocks, a confining cage hingedly connected to said base structure and means to prevent insects escaping from said confining cage.

2. In an insect trap, the combination, of a base structure composed entirely of wood and comprising a bottom board having end strips extending along its ends, a plurality of base blocks attached to its upper surface along the side edges, the ends of said blocks being cut angularly to provide lead openings the sides of which converge as they extend inwardly, and a confining cage carried by said base structure, and means to prevent the escape of insects from the confining cage.

3. In an insect trap, the combination, of a base structure composed entirely of wood and comprising a bottom board having end strips extending along its ends, and a plurality of base blocks attached to its upper surface along the side edges, the ends of said blocks being cut angularly to provide lead openings the sides of which converge as they extend inwardly, cover strips mounted upon the upper surfaces of said blocks, a confining cage hingedly connected to said bottom structure and resting upon said cover strips, and means within said confining cage to prevent the escape of insects therefrom.

4. In an insect trap, the combination of a base structure composed entirely of wood and comprising a bottom board having end strips extending along its ends, and a plurality of base blocks attached to its upper surface along the side edges, the ends of said blocks being cut angularly to provide lead openings, the sides of which converge as they extend inwardly, cover strips mounted upon the upper surfaces of said blocks and a confining cage hingedly connected to said bottom structure, said confining cage being constructed of foraminous material and having imperforate end portions, a substantially pyramidal lead structure hingedly connected to said bottom structure within said confining cage and provided with openings adapted to permit the passage of flies from the lead structure into the confining cage.

CHARLES W. BOYLE.

Copies of this patent may be obtained for five cents each, by addressing the "Commissioner of Patents, Washington, D. C."